(12) United States Patent
Kim et al.

(10) Patent No.: US 10,122,537 B2
(45) Date of Patent: Nov. 6, 2018

(54) APPARATUS AND METHOD FOR GENERATING RANDOM DIGITAL VALUE

(71) Applicant: ICTK Co., Ltd., Gyeonggi-do (KR)

(72) Inventors: Dong Kyue Kim, Seoul (KR); Byong Deok Choi, Seoul (KR)

(73) Assignee: ICTK HOLDINGS CO., LTD., Seoul (KR)

( * ) Notice: Subject to any disclaimer, the term of this patent is extended or adjusted under 35 U.S.C. 154(b) by 71 days.

(21) Appl. No.: 15/109,327

(22) PCT Filed: Dec. 30, 2014

(86) PCT No.: PCT/KR2014/013020
§ 371 (c)(1),
(2) Date: Jun. 30, 2016

(87) PCT Pub. No.: WO2015/102359
PCT Pub. Date: Jul. 9, 2015

(65) Prior Publication Data
US 2016/0330038 A1    Nov. 10, 2016

(30) Foreign Application Priority Data

Dec. 31, 2013    (KR) .................. 10-2013-0168530

(51) Int. Cl.
*H04L 29/06*    (2006.01)
*H04L 9/32*    (2006.01)
(Continued)

(52) U.S. Cl.
CPC ............ *H04L 9/3278* (2013.01); *G06F 21/73* (2013.01); *G09C 1/00* (2013.01); *H04L 9/0866* (2013.01); *H04L 2209/12* (2013.01)

(58) Field of Classification Search
CPC ..... H04L 9/0866; H04L 9/3278; G06F 21/73; G09C 1/00
See application file for complete search history.

(56) References Cited

U.S. PATENT DOCUMENTS 5,802,592 A    9/1998    Chess et al.
6,047,068 A    4/2000    Rhelimi et al.
(Continued)

FOREIGN PATENT DOCUMENTS

EP    2 230 794 A2    9/2010
JP    09-293040 A    11/1997
(Continued)

OTHER PUBLICATIONS

Supplementary European Search Report for European Application No. EP 14877400 (PCT/KR2014/013020), dated Dec. 16, 2016 (9 pages).
(Continued)

*Primary Examiner* — Brandon Hoffman
*Assistant Examiner* — Thong Truong
(74) *Attorney, Agent, or Firm* — Finnegan, Henderson Farabow, Garrett & Dunner, LLP (57) ABSTRACT

Provided is an apparatus for generating digital values to provide a random digital value. The apparatus may generate the digital value based on a semiconductor process variation. The apparatus may include a generating unit to generate a plurality of digital values, based on the semiconductor process variation, and a processing unit to process the digital values and to provide a first digital value. The generating unit may include a plurality of physically unclonable functions (PUFs). A parameter may be differently applied to the PUFs, and the PUFs may generate the digital values.

16 Claims, 8 Drawing Sheets

(51) Int. Cl.
  *G06F 21/73* (2013.01)
  *G09C 1/00* (2006.01)
  *H04L 9/08* (2006.01)

(56) References Cited

U.S. PATENT DOCUMENTS

| | | | |
|---|---|---|---|
| 6,118,279 | A | 9/2000 | Field et al. |
| 6,275,062 | B1 | 8/2001 | Starr |
| 6,941,536 | B2 | 9/2005 | Muranaka |
| 7,282,377 | B2 | 10/2007 | Muranaka |
| 7,665,049 | B2 | 2/2010 | Muranaka |
| 8,525,169 | B1 * | 9/2013 | Edelstein .............. H01L 23/544 257/48 |
| 2003/0108204 | A1 | 6/2003 | Audebert et al. |
| 2004/0053429 | A1 | 3/2004 | Muranaka |
| 2005/0263605 | A1 | 12/2005 | Muranaka |
| 2006/0131575 | A1 | 6/2006 | Okuno |
| 2008/0028349 | A1 | 1/2008 | Muranaka |
| 2009/0189744 | A1 | 7/2009 | Wang et al. |
| 2010/0031065 | A1 | 2/2010 | Futa et al. |
| 2010/0070777 | A1 | 3/2010 | Salters et al. |
| 2011/0055649 | A1 | 3/2011 | Koushanfar et al. |
| 2011/0080715 | A1 | 4/2011 | Chiao-Li |
| 2011/0087897 | A1 | 4/2011 | Nelson et al. |
| 2011/0239002 | A1 | 9/2011 | Beckmann et al. |
| 2011/0317829 | A1 * | 12/2011 | Ficke ................... H04L 9/3278 380/46 |
| 2013/0147511 | A1 | 6/2013 | Koeberl et al. |

FOREIGN PATENT DOCUMENTS

| | | |
|---|---|---|
| JP | 2004-511082 | 4/2004 |
| JP | 2006-173485 | 6/2006 |
| KR | 10-1139630 | 4/2012 |
| TW | 2014-38449 | 10/2014 |
| WO | WO 01-73841 A2 | 10/2001 |
| WO | WO 02-50910 A1 | 6/2002 |
| WO | WO 2008-056612 | 5/2008 |
| WO | WO 2010-123185 A1 | 10/2010 |
| WO | WO 2013/025060 A2 | 2/2013 |
| WO | WO 2013-107593 A1 | 7/2013 |
| WO | WO 2014/124023 A1 | 8/2014 |

OTHER PUBLICATIONS

Kumar, Raghavan, et al.; "PHAP: Password Based Hardware Authentication Using PUFs"; 2012 IEEE/ACM 45$^{th}$ International Symposium on Microarchitecture Workshops; Dec. 1, 2012; pp. 24-31.

International Search Report for PCT/KR2014/013020 dated Mar. 20, 2015.

European Search Report (Extended) for Application No. EP 11847167.1 (PCT/KR2011000605) dated Mar. 23, 2017 (7 pages).

International Search Report, dated Jan. 13, 2012, in International Application No. PCT/KR2011/000605 (2 pages).

* cited by examiner

Reading PUF$_1$ → 000000000000000000000000000000 → A$_1$

000000000000000000000000000000

⋮ ⋮

000000000000000000000000000000

Reading PUF$_p$ → 000000100010000101100000011110000 → A$_p$

⋮ ⋮

Reading PUF$_m$ → 010100010001011011110010100010 → A$_m$0

⋮ ⋮

Reading PUF$_q$ → 011110011010111000111010110110 → A$_q$

111111111111111111111111111111

⋮ ⋮

Reading PUF$_n$ → 111111111111111111111111111111 → A$_n$

FIG. 4

$A_1 = \begin{array}{c} a_{11} \\ \oplus \end{array}$    $a_{12}$    $a_{13}$    $a_{14}$    $a_{15}$    ....    $a_{1k}$ $A_2 = \begin{array}{c} a_{21} \\ \oplus \end{array}$    $a_{22}$    $a_{23}$    $a_{24}$    $a_{25}$    ....    $a_{2k}$ $A_3 = a_{31}$    $a_{32}$    $a_{33}$    $a_{34}$    $a_{35}$    ....    $a_{3k}$ $\vdots$ $A_p = a_{p1}$    $a_{p2}$    $a_{p3}$    $a_{p4}$    $a_{p5}$    ....    $a_{pk}$ $\vdots$ $A_m = a_{m1}$    $a_{m2}$    $a_{m3}$    $a_{m4}$    $a_{m5}$    ....    $a_{mk}$ $\vdots$ $A_q = a_{q1}$    $a_{q2}$    $a_{q3}$    $a_{q4}$    $a_{q5}$    ....    $a_{qk}$ $\vdots$ $A_{(n-1)} = \begin{array}{c} a_{(n-1)1} \\ \oplus \end{array}$    $a_{(n-1)2}$    $a_{(n-1)3}$    $a_{(n-1)4}$    $a_{(n-1)5}$    ....    $a_{(n-1)k}$ $A_n = a_{n1}$    $a_{n2}$    $a_{n3}$    $a_{n4}$    $a_{n5}$    ....    $a_{nk}$ $\parallel$ $B = b_1$    $b_2$    $b_3$    $b_4$    $b_5$    ....    $b_k$

FIG. 5

$A_p = [a_{p1}\ |\ a_{p2}\quad a_{p3}\quad a_{p4}\quad a_{p5}\quad ....\ a_{pk}$

⊕

$A_{p+1} = a_{(p+1)1}\ |\ a_{(p+1)2}\quad a_{(p+1)3}\quad a_{(p+1)4}\quad a_{(p+1)5}\quad ....\ a_{(p+1)k}$

⊕

⋮ ⋮

⊕

$A_{q-1} = a_{(q-1)1}\ |\ a_{(q-1)2}\quad a_{(q-1)3}\quad a_{(q-1)4}\quad a_{(q-1)5}\quad ....\ a_{(q-1)k}$

⊕

$A_q = a_{q1}\ |\ a_{q2}\quad a_{q3}\quad a_{q4}\quad a_{q5}\quad ....\ a_{qk}$

=

$B = [b_1\ |\ b_2\quad b_3\quad b_4\quad b_5\quad ....\ b_k$

APPARATUS AND METHOD FOR GENERATING RANDOM DIGITAL VALUE

TECHNICAL FIELD

Embodiments relate to a security field, and more particularly, to a physically unclonable function (PUF) that may generate a random digital value based on a process variation.

BACKGROUND ART

A physically unclonable function (PUF) may provide an unpredictable digital value. Individual PUFs may provide different digital values, even though the individual PUFs are manufactured through the same exact manufacturing process.

The PUF may be referred to as a physical one-way function (POWF) that is practically impossible to be duplicated, or a physical random function (PRF).

A characteristic of the PUF may be used to generate an encryption key for security and/or authentication. For example, a PUF may be used to provide a unique key to distinguish devices from one another.

Korean Patent Registration No. 10-1139630 (hereinafter, referred to as "'630 patent") proposes a method of implementing a PUF. The '630 patent discloses a method of generating a PUF by probabilistically determining whether an inter-layer contact or a via is generated between conductive layers or conductive nodes of a semiconductor, based on a semiconductor process variation. In one of embodiments disclosed in the '630 patent, a via to be formed between conductive layers may be designed to have a small size and accordingly, a situation in which the via is formed, and a situation in which the via is not formed may randomly occur. In other words, a random digital value may be generated, and artificially guessing of the random digital value is impossible. However, in the '630 patent, to increase a yield of the PUF, an optimal via size needs to be determined, so that individual bit values included in a digital value generated by the PUF may correspond to a true random number, and may not be biased to either "0" or "1."

Accordingly, a first pass of generating PUFs based on various via sizes, examining digital values generated by the PUFs, and determining an optimal via size to be used in a specific process, may be performed prior to the specific process. Additionally, a second pass of generating an actual PUF based on the determined optimal via size may be performed. However, the optimal via size may not be optimal in a predetermined wafer and/or chip, because different process variations may occur for each individual wafer and/or individual chip, even in the same process. Furthermore, despite the same process and the same line, an optimal value may be changed due to a change in a process environment or a change in various factors, over time. Accordingly, there is a desire for a method of increasing a yield of a PUF generation.

DISCLOSURE OF INVENTION

Technical Solutions

An aspect provides an apparatus for generating a digital value based on a semiconductor process variation.

According to an aspect, there is provided an apparatus for generating a digital value based on a semiconductor process variation, the apparatus including a generating unit to generate a plurality of digital values, based on the semiconductor process variation, and a processing unit to process the digital values and to provide a first digital value. The generating unit may include a plurality of physically unclonable functions (PUFs), and at least a portion of the PUFs may be manufactured by differently applying at least one parameter causing the semiconductor process variation. The PUFs may generate the digital values.

At least one of the PUFs may include at least one via formed between conductive layers in a semiconductor, and at least one of the digital values may be generated based on whether the conductive layers are shorted by the via. The parameter may include a size of the via. The size of the via may be selected from a range between a minimum value and a maximum value of a size of a via corresponding to whether the via causes a short between the conductive layers determined in a test process performed prior to a process of manufacturing the apparatus. The range may be referred to as an effective range. Different via sizes in the range may be applied to the PUFs.

The processing unit may select, as the first digital value, a value meeting a predesignated condition from among the digital values. The predesignated condition may be generated by a PUF in which the applied parameter has a minimum value, among at least one PUF that each provides a digital value corresponding to a bit sequence including both "0" and "1."

Additionally, the predesignated condition may be generated by a PUF in which the applied parameter has a median value between a minimum value and a maximum value, among at least one PUF that each provides a digital value corresponding to a bit sequence including both "0" and "1."

The processing unit may perform a logical operation on the digital values for each bit sequence, and may calculate the first digital value.

The logical operation may be an eXclusive OR (XOR) logical operation.

According to an aspect, there is provided a method of generating a digital value by an apparatus for generating a digital value based on a semiconductor process variation, the method including generating, by a plurality of PUFs, a plurality of digital values, the PUFs being manufactured by differently applying at least one parameter causing the semiconductor process variation, and processing, by a processing unit, the digital values and providing a first digital value.

At least one of the PUFs may include at least one via formed between conductive layers in a semiconductor, and the generating may include generating at least one of the digital values based on whether the conductive layers are shorted by the via.

The parameter may include a size of the via. The size of the via may be selected from a range between a minimum value and a maximum value of a size of a via corresponding to whether the via causes a short between the conductive layers determined in a test process performed prior to a process of manufacturing the apparatus. Different via sizes in the range may be applied to the PUFs.

The processing may include selecting, as the first digital value, a value meeting a predesignated condition from among the digital values.

The predesignated condition may be generated by a PUF in which the applied parameter has a minimum value, among at least one PUF that each provides a digital value corresponding to a bit sequence including both "0" and "1."

Additionally, the predesignated condition may be generated by a PUF in which the applied parameter has a median value between a minimum value and a maximum value, among at least one PUF that each provides a digital value corresponding to a bit sequence including both "0" and "1."

The processing may include performing a logical operation on the digital values for each bit sequence, and calculating the first digital value.

The logical operation may be an XOR logical operation.

BEST MODE FOR CARRYING OUT THE INVENTION

Hereinafter, some embodiments will be described in detail with reference to the accompanying drawings. The scope of the right may, however, should not be construed as limited to the embodiments set forth herein. Regarding the reference numerals assigned to the elements in the drawings, it should be noted that the same elements will be designated by the same reference numerals. Also, terms used herein are selected from general terms being used in the related arts. Yet, the meanings of the terms used herein may be changed depending on a change and/or development of technologies, a custom, or preference of an operator in the art. Accordingly, the terms are merely examples to describe the example embodiments, and should not be construed as limited to the technical idea of the present disclosure. In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

Figure 1:
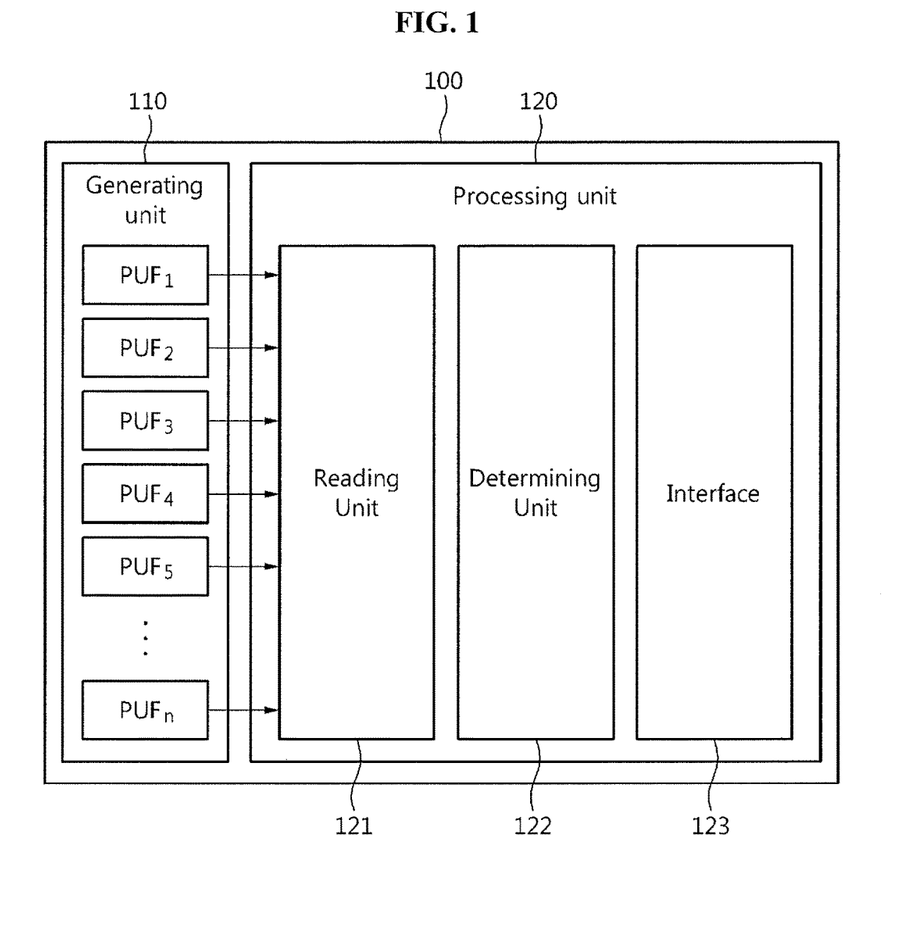
FIG. 1 is a block diagram illustrating a digital value generation apparatus according to an embodiment.

FIG. 1 is a block diagram illustrating a digital value generation apparatus 100 according to an embodiment. The digital value generation apparatus 100 may include a generating unit 110, and a processing unit 120. The generating unit 110 may generate a plurality of digital values, based on a semiconductor process variation. The processing unit 120 may process the digital values, and may provide a first digital value.

The generating unit 110 may include a plurality of physically unclonable functions (PUFs), for example, a $PUF_1$ through a $PUF_n$, to generate random digital values based on the semiconductor process variation. The PUFs may be, for example, conceptually discriminable portions in a semiconductor structure included in the generating unit 110. Each of the PUFs may generate a random digital value, based on the semiconductor process variation. Each of the above digital values may include a bit sequence. The PUFs may not be physically duplicated, and the generated digital values may have time invariance. In the following description, the PUFs may be represented by $PUF_i$. In the $PUF_i$, i denotes a conceptual index to identify the PUFs, and may be an integer. The identifying may be different in concept from a structural identification or an arrangement in an actual circuit. Accordingly, it may be understood that the generating unit 110 corresponds to a PUF, and that a $PUF_i$ corresponds to a portion of the generating unit 110.

As shown in FIG. 1, the generating unit 110 may include n PUFs, and n may be a natural number. The n PUFs may be generated using different process elements and/or different design elements that may have an influence on a probability that individual bits included in a randomly generated digital value are "0," or a probability that the individual bits are "1." Hereinafter, the above elements may be referred to as "parameters."

According to an embodiment, a $PUF_i$ may include k vias formed between conductive layers in a semiconductor. k may be a natural number and denotes a number of vias included in the $PUF_i$. A digital value "1" or "0" may be generated for each of the k vias, based on whether each of the k vias causes a short between the conductive layers. Accordingly, a single $PUF_i$ may provide a digital value with k bits, and the generating unit 110 may generate n digital values.

According to an embodiment, n PUFs may be generated by applying different parameters. In a via-related embodiment, a parameter may be a via size. For example, the $PUF_1$ through $PUF_n$ may be designed and/or manufactured to have different via sizes. As described above, the via-related embodiment is merely an example of generating a PUF, and the parameter may be changed in other embodiments of generating a PUF. Accordingly, the via-related embodiment should be construed to be an example to facilitate understanding, even though there is no particular description. For example, a PUF may be implemented based on a difference in a randomized electrical characteristic between identical elements in an electronic circuit, or a PUF may have different types of spacing between conductive layers in a semiconductor, and the like. Accordingly, a large number of embodiments of implementing a PUF may be applicable together with and/or instead of the via-related embodiment.

A PUF of an effective range is described now. As described above, n PUFs may have different parameters, for example, via sizes. A smallest via size may be provided in the $PUF_1$, and a largest via size may be provided in the $PUF_n$. When a via size decreases, a probability that a via passing through a process is abnormally generated may increase. When the via size increases, a probability that a via passing through a process is normally generated may relatively increase. In the present disclosure, the effective range may refer to a range of a parameter in which both "0" and "1" are included in binary values generated by a $PUF_i$, instead of a range of a parameter in which only either "0," or "1." For example, in the via-related embodiment, a range of via sizes in which both "0" and "1" are included in the binary values of the PUF, may be an effective range. By providing a predetermined margin in the above range, it is possible to broaden or narrow the range, and an interval including the range may be substantially represented as an effective range. Hereinafter, a PUF structure associated with the embodiment of using a via size set in an effective range will be described with reference to FIG. 2.

Figure 2:
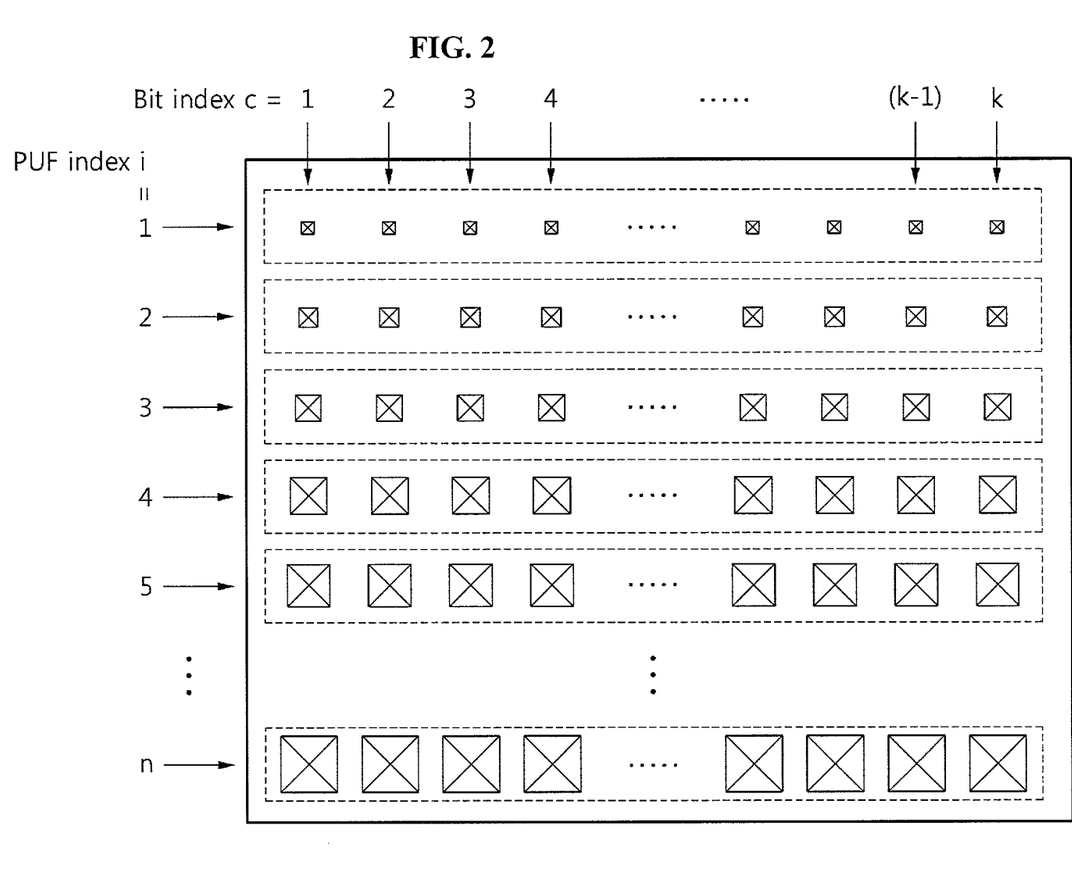
FIG. 2 illustrates a configuration of a generating unit of FIG. 1.

FIG. 2 illustrates a configuration of the generating unit 110. Referring to FIG. 2, k vias may have the same size in a $PUF_i$ with the same PUF index i. The size may be selected as an appropriate size based on whether each of the k vias randomly causes a short between conductive layers. For example, theoretically, a probability that each of the k vias causes a short between the conductive layers, and a probability that each of the k vias fails to cause a short between the conductive layers may be equally "½." In this example, a size of each of the k vias may be an optimal via size. In the related art, a first pass may be performed prior to a specific process of generating a PUF. An optimal via size to be used in the specific process may be determined in the first pass, and a second pass may be performed to generate a large number of PUFs that are to be actually used based on the optimal via size. Despite the second pass being performed by applying the optimal via size determined in the first pass, a probability that a via causes a short between conductive layers may not be maintained as "½" for each individual wafer and/or individual PUF chip (even in a single wafer). This may be recognized as a problem to be solved, to utilize a random number generated by a PUF in various industry fields, in particular, a security field.

Accordingly, depending on embodiments, PUFs having various via sizes in an effective range, instead of selecting a single specific optimal via size, may be generated in a single chip. An optimal PUF; may be selected from the PUFs and used, or a value of a PUF with high randomness may be used by processing values of predetermined PUFs, and thus it is possible to greatly increase a yield of a process of manufacturing a PUF. In other words, PUFs having various values may be generated in a single chip, predetermined PUFs may be selected or processed among the PUFs, and the selected PUFs or the processed PUFs may be used. Accordingly, a problem of an imbalance between values "0" and "1" in generation values of the PUFs may be removed. A difference between a frequency of occurrence of "0" and a frequency of occurrence of "1" in a final digital value generated and used may be significantly reduced and thus, the PUFs may be used for security. For reference, to determine a generated digital value to be a true random number, a predetermine test of determining whether the frequency of occurrence of "0" and the frequency of occurrence of "1" are similar to each other may need to be passed. As stated in "A Statistical Test Suite for Random and Pseudorandom Number Generators for Cryptographic Applications" of the National Institute of Standards and Technology (NIST) Special Publication 800-22, random numbers used in a security field need to pass a frequency test or a Monobit test. According to embodiments, it is possible to greatly increase a yield of generating a PUF capable of passing the above randomness test.

According to an embodiment, various via hole sizes may be implemented in the generating unit 110, instead of determining a single via hole size in advance and generating PUFs with the determined via hole size. In the embodiment, a "parameter causing a process variation" may be a "size of a via hole." In other words, it may be difficult to exactly know a size of an individual via hole designed to determine whether a probability that an individual via causes a short between conductive layers is equal to a probability that the individual via fails to cause a short between conductive layers. Additionally, even though the size of the individual via hole is known, a different result may be derived from an actual process. Thus, PUFs to which various parameters are applied may be implemented in a single chip.

In FIG. 2, the $PUF_1$ through the $PUF_n$ in the generating unit 110 may be manufactured to have different via hole sizes. In a specific PUF index i, a k-bit sequence (hereinafter, referred to as a "PUF bit sequence") may exist. When the k-bit sequence is used as a digital value of k bits, n different digital values may be generated. In the present disclosure, for convenience of description, a binary bit sequence of k bits provided by the $PUF_n$ including k vias with the same via size may be referred to as a single "PUF digital value."

A bit number k, or a type n of different via hole sizes implemented in a single chip may be variously set based on a length of a required random number, a process progress condition, a requirement to pass a randomness test, an application field of a PUF, and the like. Referring to FIG. 2, the $PUF_1$ may have the smallest via hole size, and the $PUF_n$ may have the largest via hole size, that is, via hole sizes may increase in an order of the $PUF_1$ to the $PUF_n$. The order may be provided for convenience of description, and may not need to be implemented as an order in which a size increases. Additionally, a degree to which a via hole size increases may be variously set. For example, the via hole size may increase at a predetermined ratio, or may increase by a uniform diameter. In another example, a difference between via hole sizes may be reduced in the vicinity of a $PUF_{(n/2)}$, in comparison to the $PUF_1$ or the $PUF_n$ and accordingly an accuracy may be increased.

For reference, in the present disclosure, an example in which a via causes a short between conductive layers may correspond to a binary value "1," and an example in which a via fails to cause a short between conductive layers may correspond to a binary value "0." Determining of either the binary value "1" or "0" based on whether a via causes a short between conductive layers is merely an example to facilitate understanding. For example, based on whether a readout circuit has a pull-down configuration or a pull-up configuration, the binary value "1" may correspond to an example in which a via fails to cause a short between conductive layers, and the binary value "0" may correspond to an example in which a via causes a short between conductive layers.

Referring back to the drawings, in the $PUF_1$ with the smallest via hole size, all k bits in a PUF bit sequence may be "0." In the $PUF_n$ with the largest via hole size, all k bits in a PUF bit sequence may be "1." According to an embodiment, the $PUF_1$ may have a minimum via hole size that is designed and manufactured in a process and that is expected to generate "0" and "1," or a minimum via hole size determined to generate both "0" and "1" in a bit sequence as a result obtained by performing, in advance, the first pass in the process. Accordingly, the above-described embodiments may not exclude performing only a 2-Pass type process according to the related art.

The $PUF_n$ may have a maximum via hole size that is designed and manufactured in a process and that is expected to generate "0" and "1," or a maximum via hole size determined to generate both "0" and "1" in a bit sequence as a result obtained by performing, in advance, the first pass in the process.

The $PUF_i$ with various sizes may be simultaneously implemented in a single generating unit, that is, the generating unit 110 and accordingly, it is possible to prevent an entire chip from not being used because a generated PUF digital value fails to pass a random test. Using of the entire chip may have a direct influence on a yield of the generating unit 110 and/or the digital value generation apparatus 100, which may be a significant improvement in comparison to the related art.

When the generating unit 110 generates n digital values, each having k bits, the processing unit 120 of FIG. 1 may provide a final digital value. The final digital value may be provided by the digital value generation apparatus 100, based on the n digital values, and may be hereinafter referred to as a "first digital value." Various embodiments may also be provided for the above processing process, and FIGS. 3 through 6 illustrate a portion of the embodiments.

Figure 3:
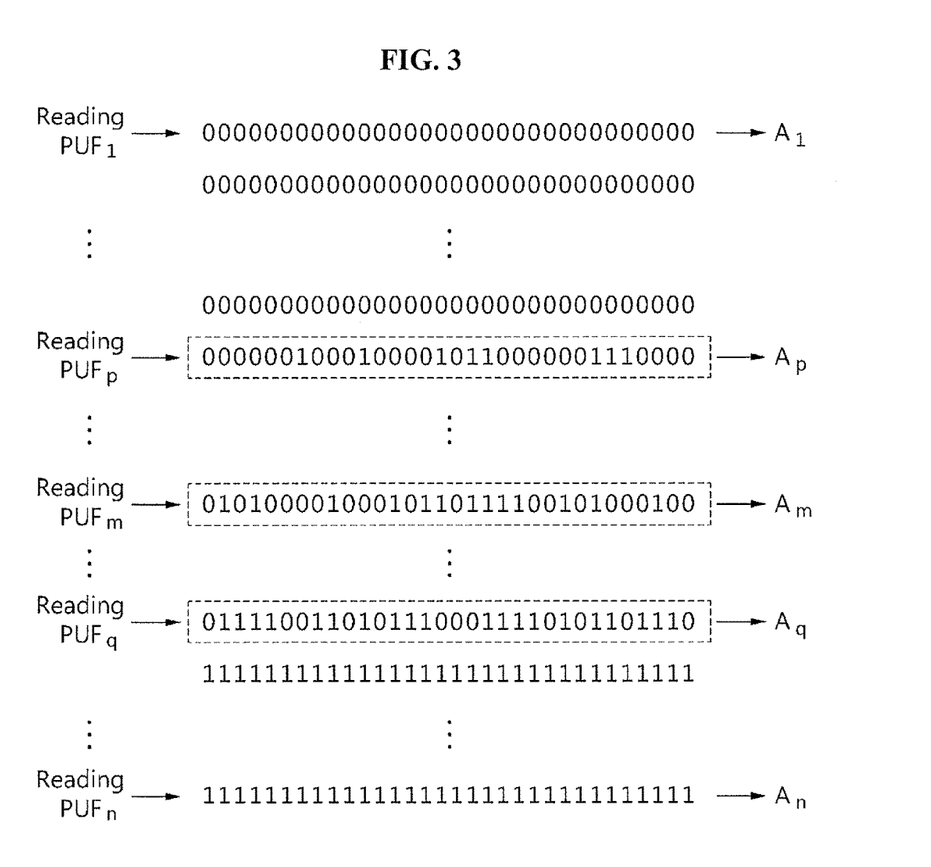
FIG. 3 illustrates an example of an operation of a processing unit of FIG. 1.

FIG. 3 illustrates an example of an operation of the processing unit 120. A reading unit 121 of the processing unit 120 may read each of PUFs, and may read PUF digital values $A_1$ through $A_n$. Because the $PUF_1$ may have the smallest via hole size and the via hole sizes may gradually increase, as described above with reference to FIG. 2, a number of 0s may be greater than a number of 1s in the digital value $A_1$, and a number of 1s may be greater than a number of 0s in the digital value $A_n$. As shown in FIG. 3, a part of the digital values including the digital value $A_1$ may have only "0," and a part of the digital values including the digital value $A_n$ may have only "1."

A determining unit 122 of the processing unit 120 may select a digital value from digital values $A_p$ through $A_q$ including both "0" and "1" among the read digital values $A_q$ through $A_n$, and may determine the selected digital value as a first digital value provided by the digital value generation apparatus 100. The digital values $A_p$ through $A_q$ may be values in an effective range. Various embodiments of selecting a digital value may be provided.

In an example, the determining unit 122 may determine, as the first digital value, the digital value $A_p$ that is an initial digital value including both "0" and "1," among the digital values $A_1$ through $A_n$ that may be represented by $A_i$. In another example, the determining unit 122 may determine, as the first digital value, the digital value $A_q$ that is a last digital value including both "0" and "1," among the digital values $A_i$. In still another example, the determining unit 122 may determine, as the first digital value, an arbitrary digital value among the digital values $A_p$ through $A_q$ including both "0" and "1," among the digital values A.

In yet another example, the determining unit 122 may determine, as the first digital value, a digital value $A_m$ with a median index between indices p and q, among the digital values $A_p$ through $A_q$ including both "0" and "1," among the digital values $A_i$. This example may be reasonable in that "0" and "1" are relatively equally distributed in the digital value $A_m$.

In a further example, the determining unit 122 may perform a logical operation on at least a portion of the digital value $A_1$ through $A_n$ bit by bit, and may calculate the first digital value. In this example, randomness of the first digital value may reach an extremely high level and accordingly, the first digital value may be appropriately used for a security field. Several methods associated with the example will be further described with reference to FIGS. 4 and 5.

Figure 4:
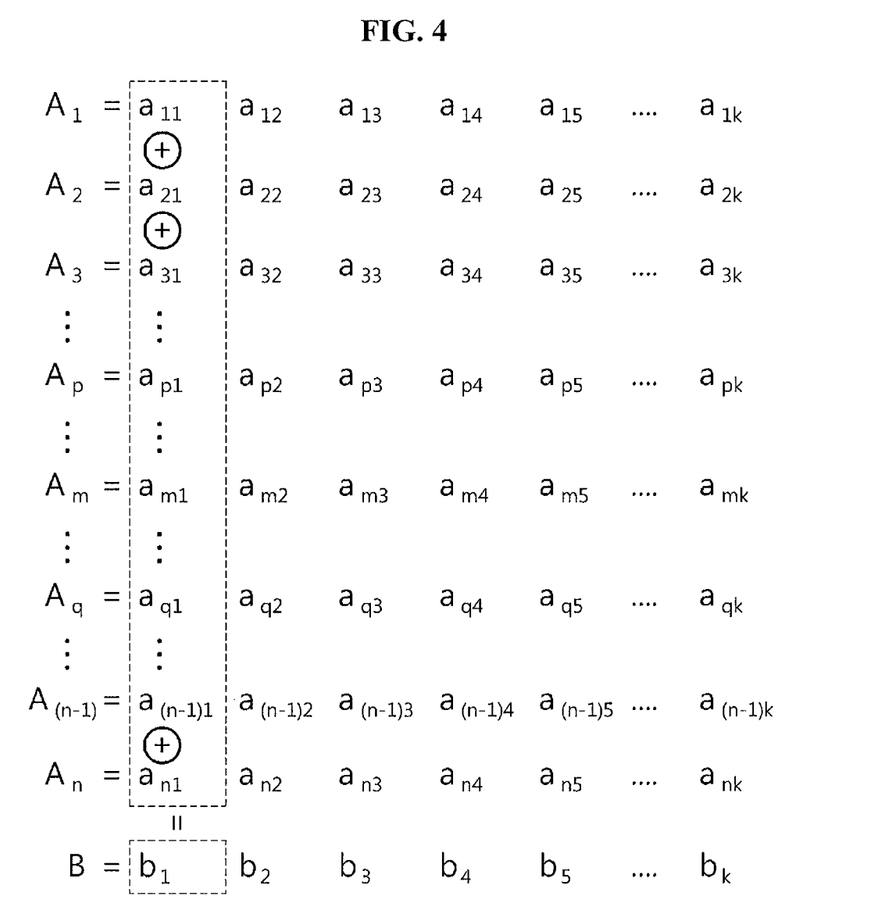
FIG. 4 illustrates another example of an operation of the processing unit of FIG. 1.

FIG. 4 illustrates another example of an operation of the processing unit 120. As shown in FIG. 4, a logical operation may be performed on bits with the same column index in the digital values $A_1$ through $A_n$, and bits of a first digital value B may be calculated.

A digital value $A_i$ may include a bit sequence of bits $a_{i1}$ through $a_{ik}$. For example, the determining unit 122 may perform a logical operation on bits $a_{1j}$ through $a_{nj}$ with the same column index j, and may calculate a bit $b_j$ of a first digital value. In this example, j may be a natural number. Various examples of the logical operation may be provided, however, there is no limitation thereto. For example, the logical operation may be an eXclusive OR (XOR) operation.

When the bits $a_{1j}$ through $a_{nj}$ include an odd number of 1s, "1" may be output through the XOR operation. When the bits $a_{1j}$ through $a_{nj}$ include an even number of 1s, "0" may be output through the XOR operation.

In an embodiment of using the XOR operation, the digital values $A_1$ through $A_n$ may be used to calculate the first digital value B and accordingly, it is possible to expect an effect of greatly increasing the entire entropy by combining entropy of a plurality of digital values. Because the XOR operation allows a probability that a bit value is "1" to close to 50% when "n" used in the XOR operation increases, the randomness of the first digital value B may be greatly increased. The first digital value B calculated by the determining unit 122 may be output by an interface 123 of the processing unit 120, and may be provided as an output of the digital value generation apparatus 100. The first digital value B may include k bits, for example, bits $b_1$, $b_2$, $b_3$, $b_4$, $b_5$, and $b_k$.

All the digital values $A_1$ through $A_n$ may be used in the XOR operation in the example of FIG. 4, however, this is merely an example. Accordingly, many other applications may also be possible. Hereinafter, other application examples will be described.

Figure 5:
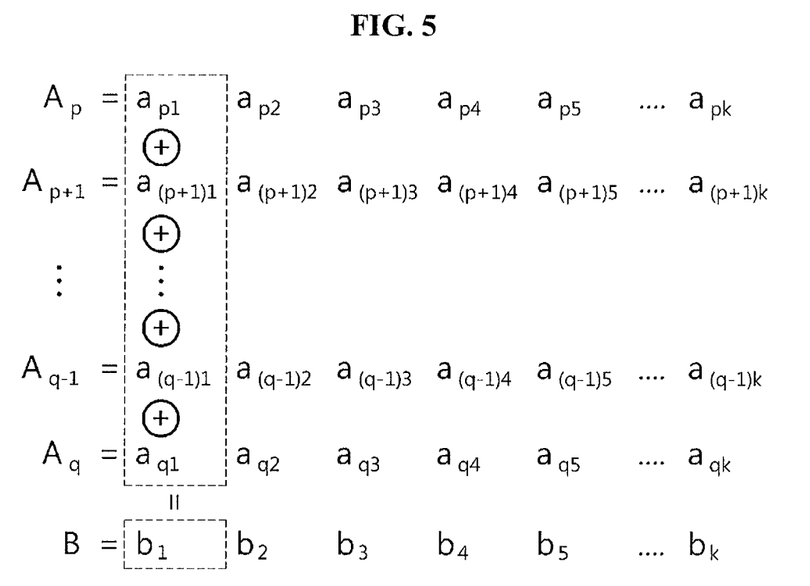
FIG. 5 illustrates still another example of an operation of the processing unit of FIG. 1.

FIG. 5 illustrates still another example of the operation of the processing unit 120. As shown in FIG. 5, the determining unit 122 may perform the XOR operation on only digital values including both bit values "0" and "1," by excluding a digital value including only bit values "0" or a digital value including only bit values "1" from the read digital values $A_1$ through $A_n$. For example, the XOR operation may be performed, bit by bit, on only the digital values $A_p$ through $A_q$, and the first digital value B may be calculated. In comparison to the example of FIG. 4 in which n input bits are used for the XOR operation, a number of bits used for the XOR operation may be reduced to a value of "q−p+1." A number of circuits for a logical operation may be reduced, and input values with a high entropy may be sorted in advance and used, which may be regarded as advantages.

In the examples of FIGS. 4 and 5, the XOR operation may be performed on bit values with the same column index j, however, there is no limitation thereto. For example, a scheme of performing the XOR operation may be modified in different forms. Accordingly, the XOR operation may be performed based on a predetermined selection rule, or performed on randomly selected bits, in addition to the XOR operation performed on bit values with the same column index j.

In an example, the XOR operation may be performed on bit values with the same PUF index i, among bit values in different PUF bit sequences including both "0" and "1." In another example, another logical operation may be performed based on an individual PUF bit sequence that is arbitrarily selected. The above modified examples will be understood by one of ordinary skill in the art throughout the present disclosure and accordingly, further description will be omitted.

As described above, the XOR operation may be replaced by another logical operation, and various examples of how to combine inputs of a logical operation may be provided.

Figure 6:
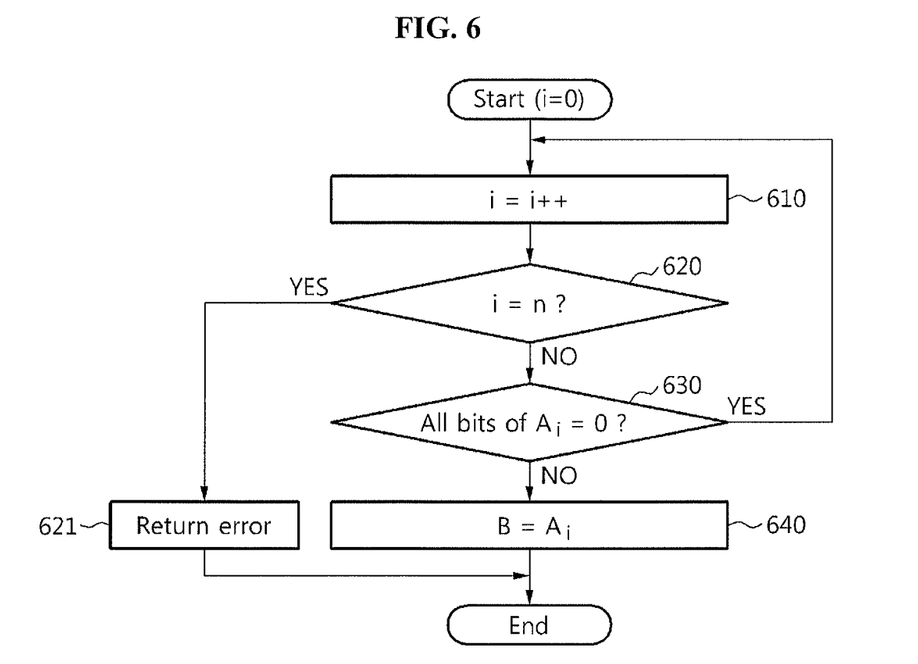
FIG. 6 is a flowchart illustrating an example of a method of generating a digital value according to an embodiment.

FIG. 6 is a flowchart illustrating an example of a method of generating a digital value according to an embodiment. The example of FIG. 6 corresponds to the example of FIG. 3 in which the determining unit 122 determines, as a first digital value B, the digital value $A_p$ that is an initial digital value including both "0" and "1," from among digital values $A_i$ generated by PUFs.

An initial value of an index i may be set to "0." In operation 610, a value of the index i may be incremented by "1." In operation 620, whether a current index i is identical to a final index n may be determined. When the first digital value B is not yet determined, when the current index i is determined to be identical to the final index n in operation 620, an error may be returned in operation 621. When the current index i is determined to be different from the final index n in operation 620, whether all bits of a digital value $A_i$ corresponding to the current index i are "0" may be determined in operation 630.

When all the bits of the digital value Ai are determined to be "0" in operation 630, the method may revert to operation 610 to perform the same process on a next index. When all the bits of the digital value $A_i$ are determined not to be "0" in operation 630, the digital value $A_i$ corresponding to the current index i may be determined as the first digital value B in operation 640. In comparison to the example of FIG. 3, the digital value $A_p$ may be determined as the first digital value B in operation 640.

Figure 7:
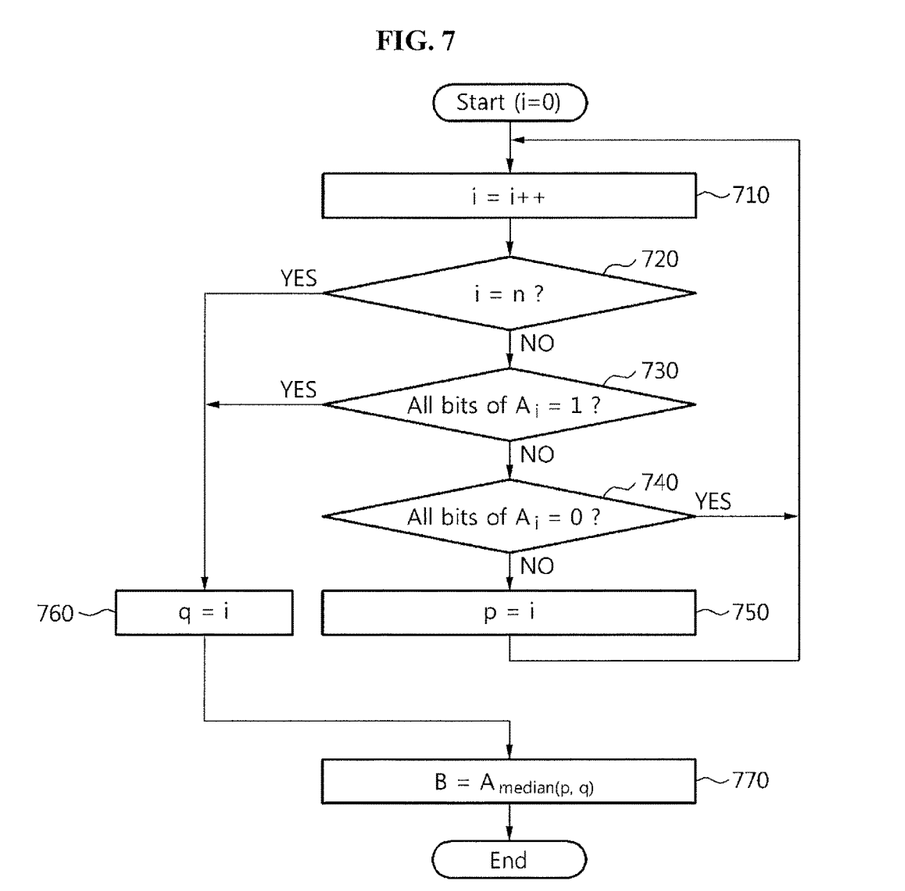
FIG. 7 is a flowchart illustrating another example of a method of generating a digital value according to an embodiment.

FIG. 7 is a flowchart illustrating another example of the method of generating a digital value according to an embodiment. The example of FIG. 7 corresponds to the example of FIG. 3 in which the digital values $A_p$ through $A_q$ including both "0" and "1" may be identified among digital values $A_i$ generated by PUFs, and in which the determining unit 122 determines, as a first digital value B, a digital value $A_m$ with a median index between indices p and q. In this example, an initial value of an index i may be set to "0," and a value of the index i may be incremented by "1" in operation 710.

When a current index i is determined to be different from a final index n in operation 720, whether all bits of a digital value $A_i$ are "1" may be determined in operation 730. When all the bits of the digital value $A_i$ are determined not to be "1" in operation 730, whether all the bits of the digital value $A_i$ are "0" may be determined in operation 740. When all the bits of the digital value $A_i$ are determined to be "0" in operation 740, the method may revert to operation 710 to increment the index, and next operations may be repeatedly performed. Conversely, when all the bits of the digital value A, are determined not to be "0" in operation 740, the current index i may be determined to be "p" in operation 750, and the method may revert to operation 710.

In the above iteration process, when all the bits of the digital value $A_i$ are determined to be "1" in operation 730, a value of q may be determined. The value of q may be determined as the current index i in operation 760. Additionally, the value of q may be determined to be a value of "(i-1)" that is lower than the current index i, although not shown. When a bit sequence in which all the bits of the digital value $A_i$ are "1" is not found and when the current index i is determined to be identical to the final index n in operation 720, the final index n may be determined as the value of q in operation 760. In operation 770, "median(p, q)," that is, a median value between values of p and q may be calculated, and a digital value $A_{median(p,q)}$ corresponding to "median(p, q)" may be determined as the first digital value B.

Figure 8:
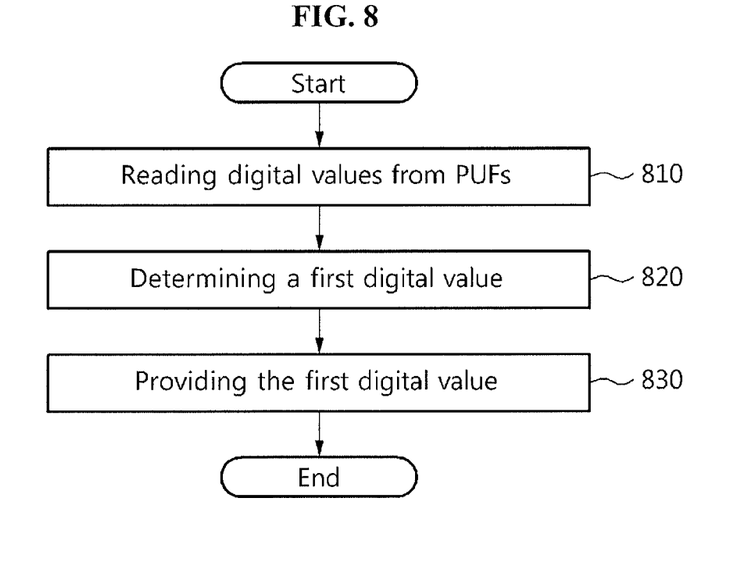
FIG. 8 is a flowchart illustrating still another example of a method of generating a digital value according to an embodiment.

FIG. 8 is a flowchart illustrating still another example of a method of generating a digital value according to an embodiment. In operation 810, a plurality of digital values generated by the generating unit 110 of the digital value generation apparatus 100 may be read by the reading unit 121. The digital values may be generated by the PUFs of FIG. 1, respectively. The reading may include reading the digital values $A_j$ through $A_n$ from the PUFs described with reference to FIGS. 1 and 2.

As described above, through the above process, n digital values, each including k bits, may be transferred to the determining unit 122. All values generated by n PUFs may not need to be read, and only a portion of the n digital values may be transferred to the determining unit 122. In operation 820, a first digital value, that is, a random number provided by the digital value generation apparatus 100 may be determined based on the digital values read by the determining unit 122.

For example, the determining unit 122 may identify digital values $A_p$ through $A_q$ including both "0" and "1," among read digital values $A_1$ through $A_n$. The determining unit 122 may select a digital value from the digital values $A_p$ through $A_q$, and may determine the selected digital value as a first digital value B. In this example, a digital value may be selected randomly, or based on a predetermined rule.

Several possible examples of the selecting have been described above with reference to FIG. 3. In an example, the determining unit 122 may determine, as the first digital value B, the digital value $A_p$ that is an initial digital value including both "0" and "1," among digital values $A_i$.

In another example, the determining unit 122 may determine, as the first digital value B, the digital value $A_q$ that is a last digital value including both "0" and "1," among the digital values $A_j$. In still another example, the determining unit 122 may determine, as the first digital value B, an arbitrary digital value among the digital values $A_p$ through $A_q$ including both "0" and "1," among the digital values $A_i$. In yet another example, the determining unit 122 may determine, as the first digital value B, a digital value $A_m$ with a median index between indices p and q, among the digital values $A_p$ through $A_q$ including both "0" and "1," among the digital values A.

In a further example, the determining unit 122 may perform a logical operation on at least a portion of the digital value $A_1$ through $A_n$ bit by bit, and may calculate the first digital value B, as described above with reference to FIGS. 4 and 5. The determining unit 122 may perform a logical operation, for example an XOR operation, on bits $a_{ij}$ through $a_{nj}$ with the same column index j, and may calculate a bit $b_j$ of the first digital value B. In this example, j may be a natural number. The example has been described above with reference to FIG. 4.

As described above with reference to FIG. 5, the determining unit 122 may perform, bit by bit, the XOR operation on only digital values $A_p$ through $A_q$ including both "0" and "1," by excluding a digital value including only "0" or a digital value including only "1" from the read digital values $A_1$ through $A_n$, and may calculate the first digital value B.

Operation 820 of determining the first digital value may be various modified, in addition to the examples of FIGS. 3 through 5. Additionally, the logical operation may be applicable to any operation for increasing entropy of digital values, in addition to the XOR operation. When the first digital value B is determined, the first digital value B may be provided as a random number provided by the digital value generation apparatus 100 in operation 830.

In the above embodiments, even though a random digital value is not generated by a PUF to which a parameter is applied, the generating unit 110, that is, the entire chip including the PUF may be available. Accordingly, it is possible to increase a PUF manufacturing yield. In addition, PUFs to which various parameters are applied may be implemented all at once and accordingly, it is possible to save a time required to separately perform a first pass. Thus, it is possible to minimize a time required for a PUF process.

Furthermore, an entropy of the finally provided first digital value B may significantly increase and accordingly, a probability that the first digital value B is available as a true random number may increase. Thus, it is possible to greatly increase a reliability indicting that a PUF is available in an application of a field in which randomness is considered to be important, for example a security field, and the like.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few exemplary embodiments of the present disclosure have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. An apparatus for generating a digital value, the apparatus comprising:
a generating unit to generate a plurality of digital values, the generating unit comprising a plurality of physically unclonable functions (PUFs), wherein a portion of the PUFs is implemented by applying at least one parameter causing a semiconductor process variation; and
a processing unit to process the digital values and to provide a first digital value,
wherein at least one of the PUFs comprises a via formed between conductive layers in a semiconductor, and
wherein the parameter comprises a size of the via selected from a range between a minimum value and a maximum value of the size of the via corresponding to whether the via causes a short between the conductive layers.

2. The apparatus of claim 1, wherein at least one of the digital values is generated based on whether the via causes a short between the conductive layers.

3. The apparatus of claim 1, wherein the size of the via is determined prior to manufacturing the apparatus.

4. The apparatus of claim 1, wherein the processing unit selects, as the first digital value among the digital values, a digital value that satisfies a condition.

5. The apparatus of claim 1, wherein the processing unit selects, as the first digital value among the digital values, a value generated by a PUF in which the applied parameter has a minimum value, among a group of PUFs that each provides a digital value corresponding to a bit sequence including both "0" and "1."

6. The apparatus of claim 1, wherein the processing unit selects, as the first digital value among the digital values, a value generated by a PUF in which the applied parameter has a median value between a minimum value and a maximum value, among a group of PUFs that each provides a digital value corresponding to a bit sequence including both "0" and "1."

7. The apparatus of claim 1, wherein the processing unit performs a logical operation on the digital values for each bit sequence, and calculates the first digital value.

8. The apparatus of claim 7, wherein the logical operation is an eXclusive OR (XOR) logical operation.

9. A method of generating a digital value by an apparatus for generating a digital value based on a semiconductor process variation, the method comprising:
generating, by a plurality of physically unclonable functions (PUFs), a plurality of digital values, a portion of the PUFs being manufactured by differently applying at least one parameter causing the semiconductor process variation; and
processing, by a processing unit, the digital values and providing a first digital value, wherein at least one of the PUFs comprises a via formed between conductive layers in a semiconductor, and wherein the parameter comprises a size of the via selected from a range between a minimum value and a maximum value of the size of the via corresponding to whether the via causes a short between the conductive layers.

10. The method of claim 9, wherein the generating comprises generating at least one of the digital values based on whether the conductive layers are shorted by the via.

11. The method of claim 10, wherein the size of the via is determined in a test process performed prior to a process of manufacturing the apparatus, and different via sizes in the range are applied to the PUFs.

12. The method of claim 9, wherein the processing comprises selecting, as the first digital value among the digital values, a digital value that satisfies a condition.

13. The method of claim 12, wherein the processing unit selects, as the first digital value among the digital values, a value generated by a PUF in which the applied parameter has a minimum value, among a group of PUFs that each provides a digital value corresponding to a bit sequence including both "0" and "1."

14. The method of claim 12, wherein the processing unit selects, as the first digital value among the digital values, a value generated by a PUF in which the applied parameter has a median value between a minimum value and a maximum value, among a group of PUFs that each provides a digital value corresponding to a bit sequence including both "0" and "1."

15. The method of claim 9, wherein the processing comprises performing a logical operation on the digital values for each bit sequence, and calculating the first digital value.

16. The method of claim 15, wherein the logical operation is an eXclusive OR (XOR) logical operation.

* * * * *